(12) United States Patent
Stammers et al.

(10) Patent No.: US 10,064,058 B2
(45) Date of Patent: Aug. 28, 2018

(54) NODE SELECTION USING A COMBINATION OF SUBSCRIPTION ENTITLEMENT AND NODAL CHARACTERISTICS

(71) Applicant: CISCO TECHNOLOGY, INC., San Jose, CA (US)

(72) Inventors: Timothy P. Stammers, Raleigh, NC (US); Robert Glenn Smith, Voisins le Bretonneux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/346,548

(22) Filed: Nov. 8, 2016

(65) Prior Publication Data

US 2017/0164195 A1 Jun. 8, 2017

Related U.S. Application Data

(60) Provisional application No. 62/264,722, filed on Dec. 8, 2015.

(51) Int. Cl.
*H04W 12/00* (2009.01)
*H04W 12/06* (2009.01)
(Continued)

(52) U.S. Cl.
CPC ............ *H04W 12/06* (2013.01); *H04W 12/08* (2013.01); *H04W 48/17* (2013.01); *H04W 48/20* (2013.01);
(Continued)

(58) Field of Classification Search
CPC ..... H04W 12/06; H04W 12/08; H04W 48/20; H04W 48/02; H04W 48/17; H04W 84/12; H04W 88/16; H04L 63/164
See application file for complete search history.

(56) References Cited

U.S. PATENT DOCUMENTS 7,711,118 B2 * 5/2010 Chou .................... G06F 21/305
380/270
8,706,084 B2 4/2014 Qiang
(Continued)

FOREIGN PATENT DOCUMENTS

CN 102761935 A 10/2012

*Primary Examiner* — Khai M Nguyen
(74) *Attorney, Agent, or Firm* — Patterson + Sheridan, LLP

(57) ABSTRACT

An embodiment includes receiving at a network node associated with a mobile core network an authorization request from a network device, wherein the authorization request is received via an untrusted network; subsequent to the receiving, performing at the network node authorization of the network device; subsequent to the receiving, determining a preferred network access node for the network device, wherein the determining comprises accessing a node selection information repository containing static and dynamic information related to network access nodes and network access node groupings and wherein the static and dynamic information comprises at least one of resource usage, location, availability of mobility anchors, proximity of mobility anchors, handover opportunities, resiliency class, and time of day; and providing to the network device an initial authorization response comprising a response to the received authorization request, wherein the initial authorization response identifies the determined preferred network access node.

17 Claims, 5 Drawing Sheets

(51) Int. Cl.
*H04W 48/20* (2009.01)
*H04W 12/08* (2009.01)
*H04W 48/00* (2009.01)
H04W 84/12 (2009.01)
H04W 88/16 (2009.01)
H04L 29/06 (2006.01)
H04W 48/02 (2009.01)

(52) U.S. Cl.
CPC ........... *H04L 63/164* (2013.01); *H04W 48/02* (2013.01); *H04W 84/12* (2013.01); *H04W 88/16* (2013.01)

(56) References Cited

U.S. PATENT DOCUMENTS

| | | |
|---|---|---|
| 8,964,695 B2 | 2/2015 | Bachmann et al. |
| 2012/0188876 A1* | 7/2012 | Chow .................. H04W 48/08 370/237 |
| 2013/0163424 A1* | 6/2013 | Goerke ................ H04W 24/02 370/235 |
| 2014/0026192 A1* | 1/2014 | Gatewood ............... H04L 63/20 726/4 |
| 2014/0177523 A1 | 6/2014 | Chang et al. |
| 2016/0073423 A1 | 3/2016 | Alex et al. |
| 2017/0135031 A1* | 5/2017 | Buckley ............... H04B 1/3816 |

* cited by examiner

NODE SELECTION USING A COMBINATION OF SUBSCRIPTION ENTITLEMENT AND NODAL CHARACTERISTICS

CROSS-REFERENCE TO RELATED APPLICATION

This application claims the benefit of priority under 35 U.S.C. § 119(e) to U.S. Provisional Application Ser. No. 62/264,722, entitled "NODE SELECTION USING A COMBINATION OF SUBSCRIPTION ENTITLEMENT AND NODAL CHARACTERISTICS," filed Dec. 8, 2015.

TECHNICAL FIELD

This disclosure relates in general to the field of communications networks and, more particularly, to a technique for node selection using a combination of subscription entitlement and nodal characeristics.

BACKGROUND

An "entitlement server" is a carrier network node that performs dynamic policy (or device management) control for a given set of devices running in the carrier network. Node selection for Voice-over-WiFi ("VoWiFi") access may be preconfigured in a client device, provided to the client device via Domain Name Server ("DNS") lookup, or provided by a subscription entitlement server during verification for service usage. A key node selection event associated with VoWiFi carrier service is selection of the access point to the network from an untrusted Wi-Fi network. Such an access point is typically implemented as evolved Packet Data Gateway ("ePDG"). The primary function of an ePDG is to secure data communication with user equipment devices ("UEs") that connect to a core network via an untrusted non-3GPP network (such as a WiFi network). In general, the ePDG functions as a termination node of IPsec tunnels established with UEs.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
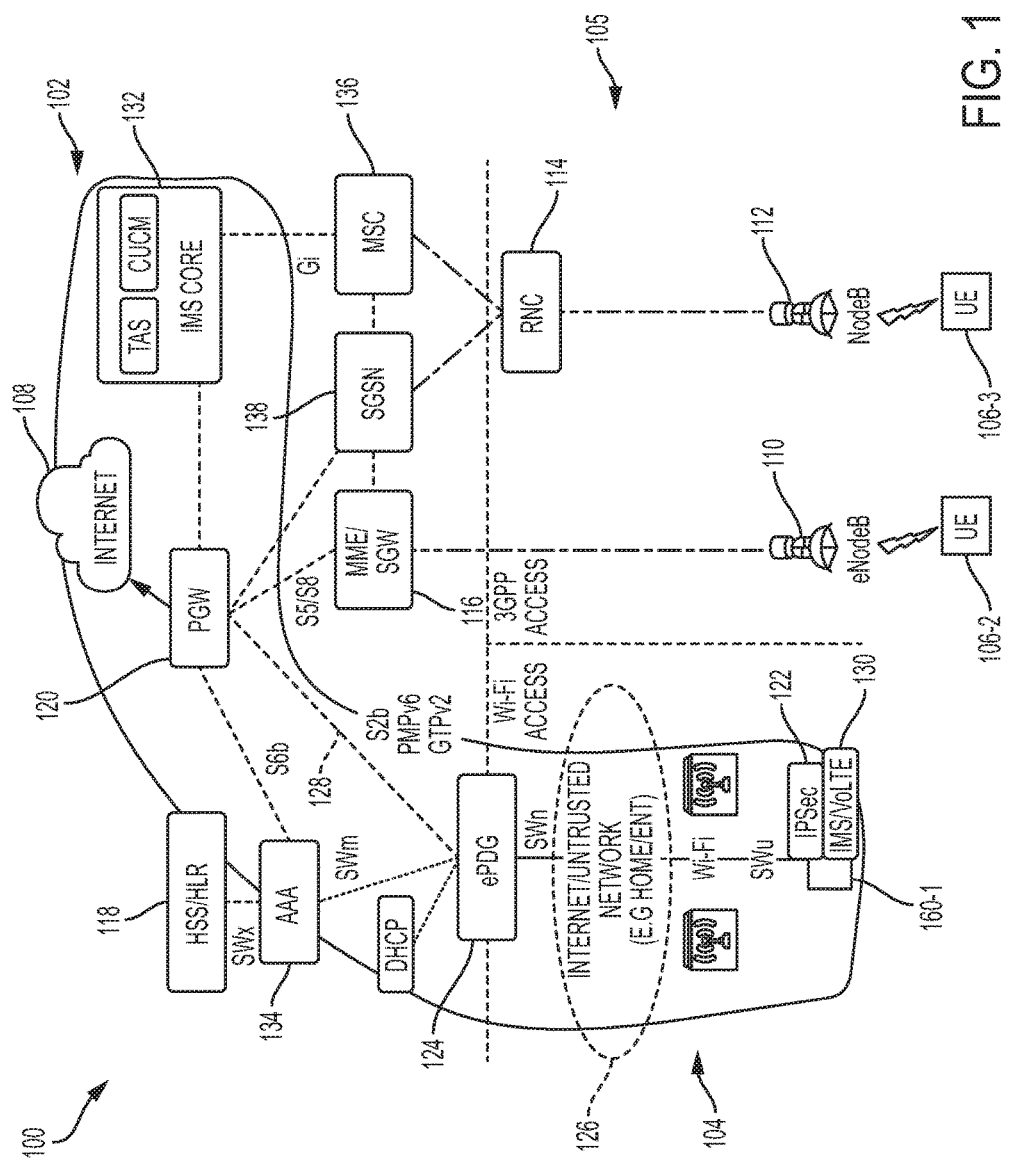
FIG. 1 is a simplified block diagram of a communications system in which an end-to-end VoWiFi solution in accordance with features of embodiments described herein may be implemented.

An embodiment includes receiving at an entitlement server associated with a mobile core network an authorization request from a network device, wherein the authorization request is received via an untrusted network; subsequent to the receiving, performing at the network node authorization of the network device; subsequent to the receiving, determining a preferred network access node for the network device, wherein the determining comprises accessing a node selection information repository containing static and dynamic information related to network access nodes and network access node groupings and wherein the static and dynamic information comprises at least one of resource usage, location, availability of mobility anchors, proximity of mobility anchors, handover opportunities, resiliency class, and time of day; and providing to the network device an initial authorization response comprising a response to the received authorization request, wherein the initial authorization response identifies the determined preferred network access node.

Example Embodiments

WiFi is arguably the most pervasive radio technology in the world. In many areas, there is more available WiFi spectrum and access technology than licensed radio systems. WiFi offers excellent coverage and capacity augmentation to enable service providers to offer enhanced customer satisfaction in a cost-effective manner. Unlicensed WiFi has been used primarily as a data-only radio system in mobile networks, with voice almost always having been carried on licensed spectrum. Recently, however, Unlicensed Mobile Access/Generic Access Network ("UMA/GAN") technologies for WiFi voice calling have been improved such that, after several iterations, new standardization, and handset advancements, VoWiFi offering transparent hand-offs from WiFi to licensed radio systems for voice calls has been rolled out by many carriers worldwide.

VoWiFi is a cost-effective solution to complement macro coverage. As many operators continue to deploy LTE networks, there will always be areas (e.g., building interiors) in which coverage is less than optimal. VoWiFi can be deployed to support voice services, complementing cellular coverage in such areas. Another advantage of VoWiFi involves customer retention. Voice calling with roaming services can be expensive, causing users to turn to over-the-top ("OTT"), or value added, providers or services (e.g., Skype) to offset high roaming costs. VoWiFi enables roaming services to be supported at a lower unit cost and with a consistent, transparent voice service. Additionally, VoWiFi enables single telephone number/multiple device access, which is beneficial for enterprise employees, who are often mobile and want to be able easily to communicate anywhere on their devices. As a result, such users in particular are increasingly interested in being reachable from either their desk phone or their mobile phone via a single telephone number. VoWiFi services enable single telephone number access on one or more mobile devices using the same number as the desk phone. VoWiFi also expands the number of voice-capable devices to cover non-SIM WiFi-only devices. With VoWiFi, users can make and receive calls on their non-SIM tablets, further enhancing additional revenue streams.

VoWiFi is based on the iWLAN solution as defined in 3GPP 23.402. Voice and text message data is sent over WiFi using an IPSec tunnel from a native smartphone client to an ePDG in the mobile core. The native client and interface to the ePDG are named, respectively, the SWu client and SWu interface. Following IPSec tunnel establishment, an IP Multimedia Subsystem-Access Point Name ("IMS-APN") is invoked and all IMS-related traffic goes through the SWu client and interface. All non-IMS traffic will either go to the LTE PDN or to a local WiFi interface.

A system and method for node selection using a combination of subscription entitlement and nodal characteristics will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a simplified block diagram of a communications system 100 in which an end-to-end VoWiFi solution in accordance with features of embodiments described herein may be implemented. As shown in FIG. 1, the communications system 100 includes a mobile core network 102, a WiFi access network 104, and a radio access network ("RAN") 105. At least a portion of the system 100 may implemented as a Long Term Evolution ("LTE") network in which one or more user equipment devices ("UEs"), represented in FIG. 1 by UEs 106, to be connected to communicate data to and from the Internet 108 via RAN 105, which includes a number of RAN nodes, represented in FIG. 1 by eNB 110 and nodeB 112 (which is connected to a radio network controller ("RNC") 114), and the mobile core network 102. In one embodiment, the core network 102 may be implemented using an Evolved Packet Core ("EPC") network as defined in 3GPP TS 23.401 and employing a user plane protocol GTPv1-U. It will be understood, however, that other implementations of the core network 102 may be employed in accordance with the features described herein.

As illustrated in FIG. 1, the core network 102 may include a mobility management entity ("MME") 116, which is responsible for control plane functions related to subscriber and session management and may be connected to a home subscriber service ("HSS") 118, which supports a database that includes user subscription information, through an S6a interface. The core network 102 may further include a serving GPRS support node (not shown) connected to the MME 116 via an S3 interface for providing functionality related to packet-data switching.

The core network 102 may further include a serving gateway ("S-GW"), which in the illustrated embodiment is co-located with the MME 116 and which serves as the termination point of the user plane interface S1-U toward the RAN network 105, and a PDN gateway ("PGW") 120, which serves as an interface to the Internet 108, sending user data from the user toward the Internet and receiving data destined for the user from the Internet. In addition, the PGW 120 supports policy enforcement features that apply operator-defined rules for resource allocation and usage, as well as packet filtering and inspection and charging support. The PGW 120 may interface with a policy charging rule function ("PCRF") (not shown), which manages the service policy and provides Qu's information for each user session. It will be recognized that the core network 102 may provide a variety of functionality in the system 100, including, for example, one or more of aggregation, user authentication, call control and switching, accounting and charging, service invocation, and gateways.

As previously noted, in one embodiment, the system 100 is implemented in accordance with the Long-Term Evolution ("LTE") standard. E-UTRAN may be used to implement the RAN 105 and is designed to improve end-user throughputs and sector capacity and reduce user plan latency, bringing significantly improved user experience with full mobility. With the emergence of IP as the protocol of choice for all types of traffic, LTE provides support for IP-based traffic with end-to-end Qu's. E-UTRAN supports various types of services, including web browsing, FTP, video streaming, VoIP, online gaming, real time video, push-to-talk, and push-to-view, for example.

UEs 106 can be associated with clients, customers, or end users wishing to initiate a communication in communication network 10 via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 100. UEs 106 may also be inclusive of a suitable interface to the human user, such as a microphone, a display, or a keyboard or other terminal equipment. UE 106 may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. On power up, UEs 106 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

In general terms, S-GW portion of MME/S-GW 116 is can be configured to route and to forward user data packets, while also acting as the mobility anchor for the user plane during inter-eNB handovers. Additionally, S-GW can act as the anchor for mobility between LTE and other 3GPP technologies. MME portion of MME/S-GW 116 can be configured to operate as a control node for the LTE access-network. It further can be responsible for idle mode UE tracking and paging procedures (including, for example, retransmissions). Furthermore, MME 116 can be involved in the bearer activation/deactivation process and can be responsible for choosing S-GW for UE 106 at the initial attach (and at time of an intra-LTE handover involving core network node relocation). MME 116 can also be responsible for authenticating the user by interacting with HSS 118. MME 116 also provides the control plane function for mobility between LTE and 2G/3G access networks.

Other functions of the MME 116 may include generating and allocating temporary identities to UEs, terminating Non-Access Stratum ("NAS") signaling, checking the authorization of UE 106 to camp on a service provider's Public Land Mobile Network ("PLMN"), and enforcing UE roaming restrictions. MME 116 serves as the termination point in the network for ciphering/integrity protection for NAS signaling and handles the security key management. Lawful interception of signaling is also supported by MME 116.

In regard to particular applications involving UE 106, media servers comprising one or more video servers may be provided, which can provide streaming video to an individual associated with UE 106 via the Internet 108. For example, an individual could be uploading (or streaming) video over the network to which UE 106 is connected. This could involve technologies such as flip video, webcams, YouTube, and various other video technologies involving any type of uploading and/or streaming video data.

For purposes of illustrating certain example techniques of communication system 100, it is important to understand the communications, including control signals, that may be traversing the network and the overload situations that can occur at various points in the system 100 due to such communications. It will be understood that, after a subscriber data session has been established in a conventional fashion between the UE 106 and the Internet 108, data packets from the UE 106 are encapsulated by the RAN node 110, 112, in accordance with GTPv1-U and forwarded on to S-GW 116 and PGW 120. The S-GW 116 and PGW 120 decapsulate the user data packets from GTPv1-U tunnel between the RAN node 110, 112, and the S-GW 116 and PGW 120 and forwards them to Internet 108. Conversely, data packets intended for the UE 106 are transmitted to the UE from the Internet 108 via the S-GW 110 and PGW 120, which encapsulates the same in accordance in GTPv1-U tunnel towards the RAN node, and the RAN node 110, 112 decapsulate the data packets upon receipt thereof.

The LTE standard includes a radio access network that employ a technology called evolved universal terrestrial radio access network ("EUTRAN") for communicating UEs and a System Architecture Evolution ("SAE") core network. As part of the EUTRAN, an eNB provides a wireless air interface for bridging UEs to the SAE core network over a wired connection. The SAE core network includes management gateways such as the MME 116, forwarding gateways such as the S-GW and PGW 120.

In operation, when UE 106 requests IP services, an IP connectivity access network bearer, or evolved packet switch ("EPS") bearer, is required to provide connectivity from UE to S-GW and back, effectively establishing an end-to-end IP path associated with a specific Qu's. Parts of the EPS bearer may use IP tunneling. The EPS bearer is similar to a packet data protocol ("PDP") context in the general packet radio service ("GPRS") core network and includes a radio bearer between UE 106 and RAN 105, an S1 bearer between RAN 105 and SGW 116, and an S5/S8 bearer between S-GW 116 and PGW 120. A generic IP tunnel or IP path may substitute for a bearer in some embodiments.

The EPS bearer may include a data structure maintained by MME/S-GW 116, which includes subscriber information and session information for identifying the traffic flow carried by the bearer. When data is delivered from the core network to S-GW 116, S-GW uses bearer information to direct the incoming packets to the correct one of the UEs 106. UEs 106 likewise attach bearer information to IP traffic bound for the core network 102, which S-GW 116 uses to maintain IP sessions and direct packets to their destinations. The bearer also carries Qu's information that applies to the traffic flow carried by the bearer.

In accordance with features of embodiments described herein, as shown in FIG. 1, an IPSec tunnel may be established over WiFi and the Internet between a native IPSec/SWu client 122 installed on UE 106-1 and an ePDG 124. Although 3GPP standards indicate that a WiFi access network is an untrusted network and therefore requires use of a secure tunnel, in reality, it may be trusted (e.g., service provider managed) or untrusted (e.g., unmanaged). The ePDG 124 is located at the edge of the mobile core network 102 and its Internet-facing interface has a public IP address that can be resolved from ePDG Fully Qualified Domain Name ("FQDN") from the UE 106-1 using Domain Name System ("DNS") lookup. ePDG 124 performs EAP-AKA-IKEv2 authentication and IPSec Security Association ("SA") establishment with the UE 106-1. After an IPsec tunnel 126 has been established between the UE 106-1 and ePDG 124, the ePDG creates a GPTv2 tunnel 128 with PGW 120. Both 3G/VoLTE and VoWiFi use the same phone application/dialer for a voice call. A VoWiFi phone application 130 on the UE 106-1 communicates with a VoLTE IP Multimedia Subsystem ("IMS") 132 over the IPSec tunnel and PGW 120 for VoIP call setup. The actual voice packets also travel through the IPsec tunnel/PGW 120 to other IP destinations. An Authentication, Authorization, and Accounting ("AAA") server 134 supports the SWm interface toward the ePDG 120 for EAP authentication. AAA server 134 communicates with HSS 118 via an SWx interface. In order to support handover, AAA server 134 supports the S6b interface to the PGW 120.

As further illustrated in FIG. 1, the mobile core network 102 may further include a Mobile Switching Center ("MSC") 136 connected to the RNC 114 and IMS core 132 and responsible for routing voice calls and SMS, setting up and releasing end-to-end connections, managing mobility and handover requirements for a connection, and managing charging and account monitoring. Mobile core network 102 may further include a Serving GPRS Support Node ("SGSN") 138 connected to RAN 24 and MSC 136 and responsible for packet routing and transfer, mobility management, logical link management, and authentication and charging functionality. SGSN 138 may also store location information and user provides of all GPRS users registered with it. SGSN 32 is connected to PGW 120 and MME/SGW 116.

In order to provide enhanced services and better carrier node resource utilization, it would be beneficial to determine the carrier network access point, such as an ePDG access, point based on various characteristics associated with that access point, such as location, availability and/or proximity of mobility anchors, handover opportunities, resiliency class, time of day, etc. Using such characteristics, it may be possible for a service provider to more optimally select both the ePDG access point and the mobility anchor (e.g., Packet Data Network Gateway, or PGW) for the requested subscriber service.

Prior to a Wi-Fi-enabled device being granted carrier (e.g., mobile core) network access, the entitlement of the corresponding subscriber for carrier services may need to be determined. Currently, as part of that determination, an access point, e.g., an ePDG (such as ePDG 116), is selected for use by that subscriber. An ePDG is identified by a FQDN or IP address assigned to the ePDG and historically, the selection may be based on static configuration data that does not account for more distributed architectures where ePDGs are distributed over a large geographic area. In accordance with features of embodiments described herein, a node selection facility is provided for selecting one of a plurality of access nodes for use by a subscriber/UE using a combination of subscription entitlement characteristics and characteristics of the various access nodes. In particular, the node selection facility has knowledge of available network access points, or access nodes, including resource usage, location, and other defining characteristics of each, and can preference one such node over another at a given time, for a given subscriber's identity, entitlement characteristics, and current location with respect to the characteristics of the node.

Figure 2:
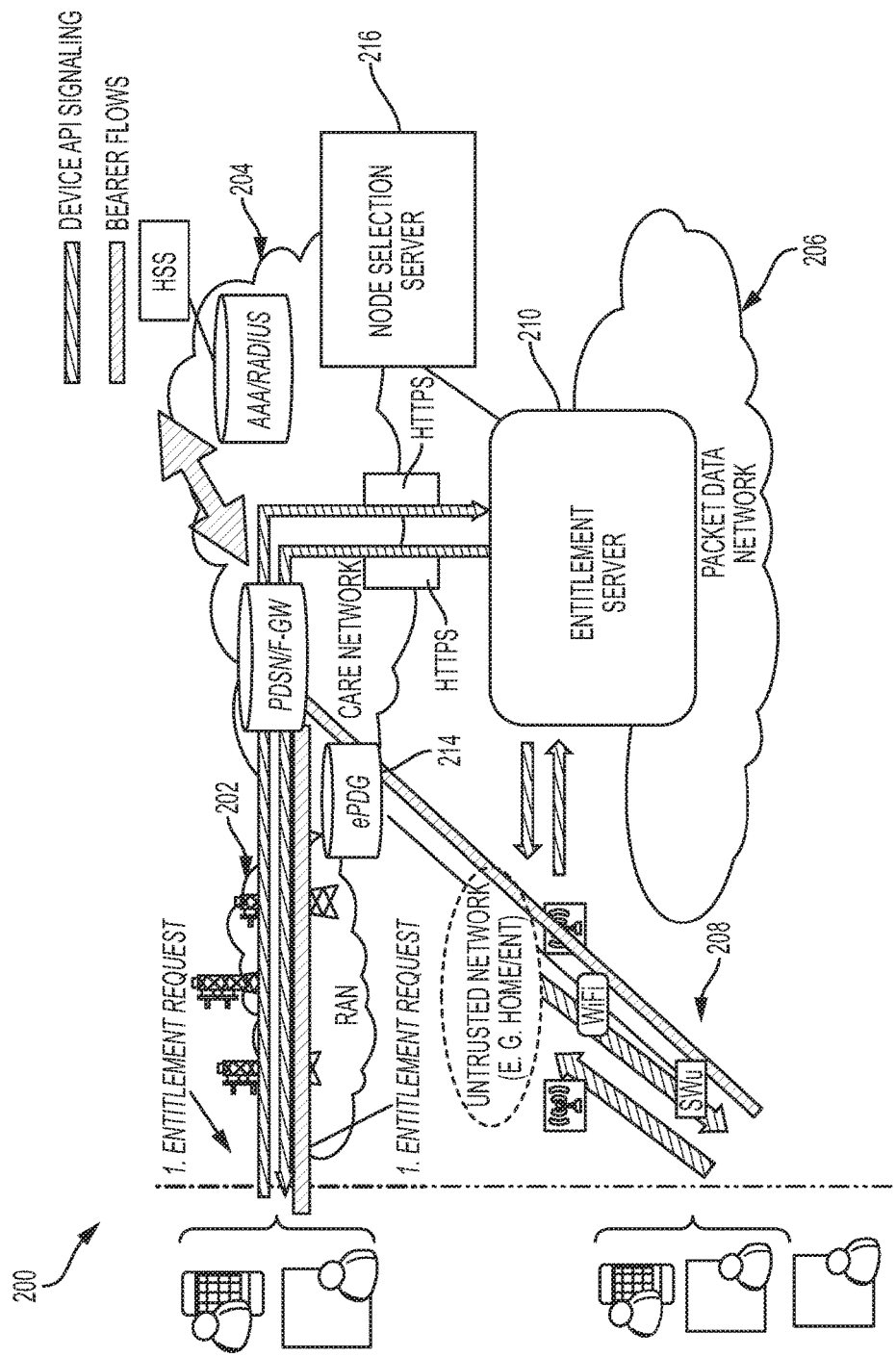
FIG. 2 is a simplified block diagram of one embodiment of a communications system for implementing an end-to-end VoWiFi solution in which an access node selection technique using a combination of subscription entitlement and nodal characteristics is implemented in accordance with embodiments described herein.

FIG. 2 illustrates a simplified block diagram of one embodiment of a communications system 200 for implementing an end-to-end VoWiFi solution in which an access node selection technique using a combination of subscription entitlement and nodal characteristics is implemented in accordance with embodiments described herein. As shown in FIG. 2, the system 200 may include a RAN 202, a WiFi access network 204, a core, or carrier, network 206, and a packet data network 208. In one embodiment, an entitlement server 210 is disposed in the packet data network 208. The entitlement server 210 is an architectural node that enables carrier-driven feature activiation and device policy control on one or more UEs, such as UEs 212. The relevant carrier features controlled and managed by the entitlement server 210 may include tethering, VOLTE, and VoWiFi, to name a few. The entitlement server can allow/restrict on a per-user, per-SIM, and per non-SIM device basis which of the carrier network features may be used and may drive auto-provisioning of such users/devices into the carrier network as needed, as alternative or in addition to over-the-air provisioning ("OTA"). This enables an optimal user experience for new feature activiation and an optimal carrier service management approach for new users in the carrier network. The core network includes a plurality of ePDGs, represented in FIG. 2 by an ePDG 214, for providing termination points for IPsec tunnels established with UEs, such as UEs 212, for communicating data to the core network 206 over the WiFi network 204. It will be recognized that, while only one ePDG 214 is shown in FIG. 2, in reality, the core network 206 may include hundreds of such ePDGs for providing access to the network 206.

In accordance with features of embodiments described herein, during operation, the entitlement server 210 may query a node selection server 216 to determine the optimal one of the ePDGs for a particular UE to use to access the network 206. During this querying process, the node selection server prepares state containing knowledge of the subscriber associated with the UE. That knowledge, which may include such data as an International Mobile Subscriber Identity ("IMSI") and other client identifiers for the subscriber, is provided by the entitlement server 202. In certain embodiments, the node selection server 216 selects the optimum one of the ePDGs for the UE to use to access the core network on every contact that the UE has with the entitlement server 202 and that FQDN or IP address of the currently selected ePDG is provided to the UE by the entitlement server, as described below with reference to FIG. 3.

In alternative embodiments, on each contact the UE has with the entitlement server 202, the entitlement server provides to the UE the FQDN or IP address of the node selection server 216, which serves as a sort of a proxy for the ePDG. The UE then sends an IKE-AUTH-INIT message to the node selection server 216, which can make an intelligent choice of ePDG based on the subscriber information learned from the entitlement server 202.

Embodiments herein are intended to optimize access point and mobility anchor point selection for a given service, such as VoWiFi, using a combination of entitlement characteristics, such as subscription identifiers, together with node selection information retained in and accessed from a node selection information repository containing both static and dynamic information related to nodes and node groupings.

Figure 3:
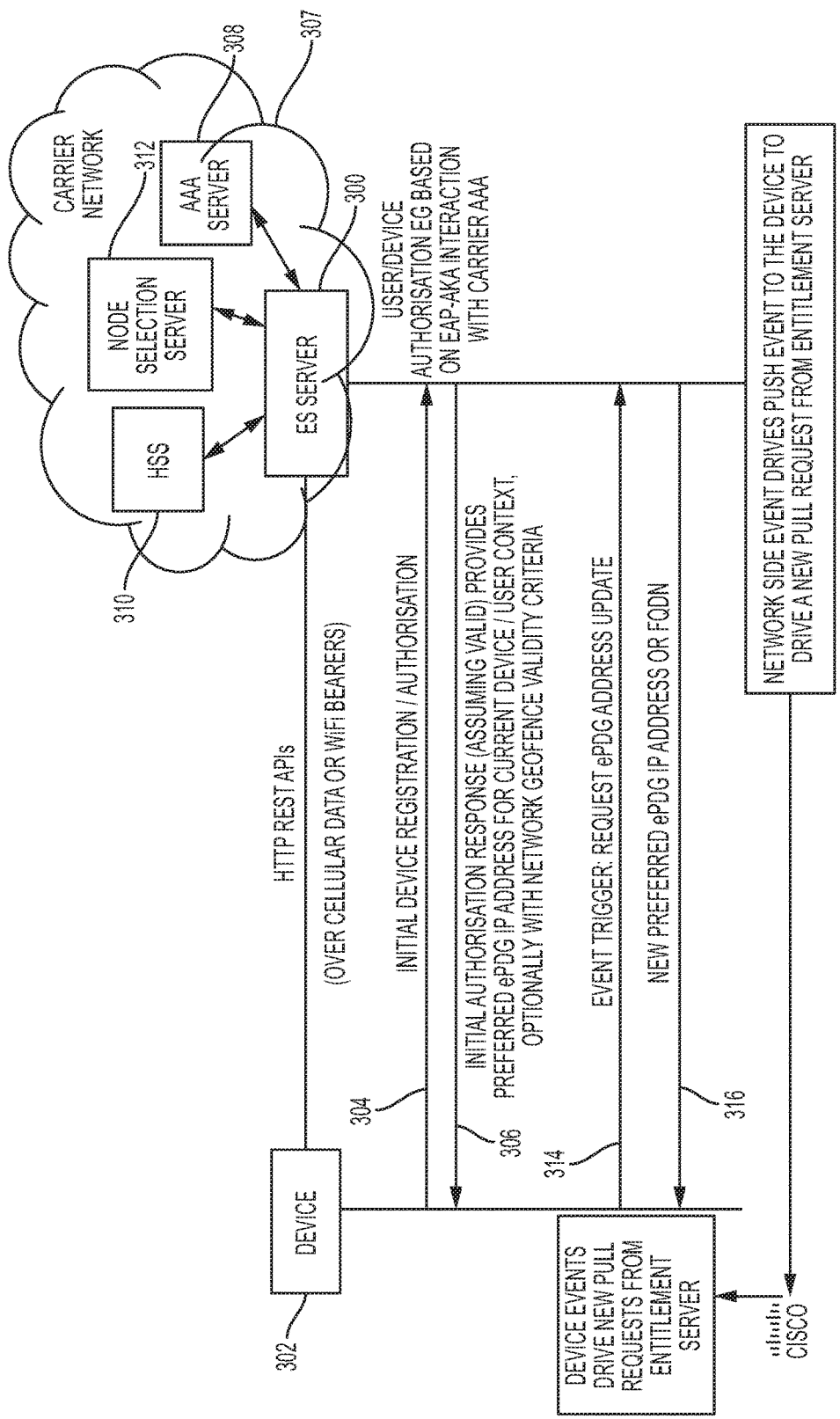
FIG. 3 illustrates a flow diagram of embodiments described herein for implementing a technique for node selection using a combination of subscription entitlement and nodal characteristics.

FIG. 3 illustrates a flow diagram of embodiments described herein for implementing a technique for node selection using a combination of subscription entitlement and nodal characteristics. As shown in FIG. 3, an entitlement server 300, which as previously noted is a network node accessible from a mobile packet core and from untrusted Wi-Fi networks, interacts with a UE device 302 using HTTP REST APIs to drive device behavior/allowances on a per-user, per-device, per-subscription basis, including a range of dynamic factors and parameters. The embodiments shown in FIG. 3 may apply to any device supporting an interface to the entitlement server 300, including both SIM and non-SIM devices. The entitlement server 300 enables SP control of device connectivity policies based on dynamic factors, such as IMSI, MNC-MCC, location, node end state, and others.

As previously noted, FIG. 3 illustrates a functional model/call flow for a technique for node selection using a combination of subscription entitlement and nodal characeristics in accordance with embodiments described herein. As represented by arrows 304 and 306, the device 302 initially requests and then receives authorization to access a carrier network 307 via, for example, an EAP-AKA interaction with an AAA server 308 of the network. In accordance with features of embodiments described herein, in response to the initial registration request (304), the entitlement server 300, in combination with HSS 310 and node selection server 312, determines a preferred ePDG for the device 302 with regard to the present device/user context, as described in detail below. The initial authorization response (if valid) provides the IP address or FQDN of the preferred ePDG IP address for the current device/user context optionally with network geofence validity criteria. Thereafter, a network side event may drive a push event to the device 302 to drive a new pull request from the entitlement server 300. In response, device events may drive a new pull request from the entitlement server 300. In either event, an event trigger 314 causes the device 302 to request an ePDG address update, in response to which the entitlement server 300 provides the IP address or FQDN of the currently preferred ePDG, as represented by an arrow 316. In this manner, the ePDG can be dynamically updated in response to changes in the network 307.

ePDG selection may alternatively be realized via a complementary model wherein the entitlement server supplies the device with an ePDG IP address of FQDN of the node selection server, which may transparently perform more granular ePDG selection based on local logic, including node balancing considerations.

Figure 4:
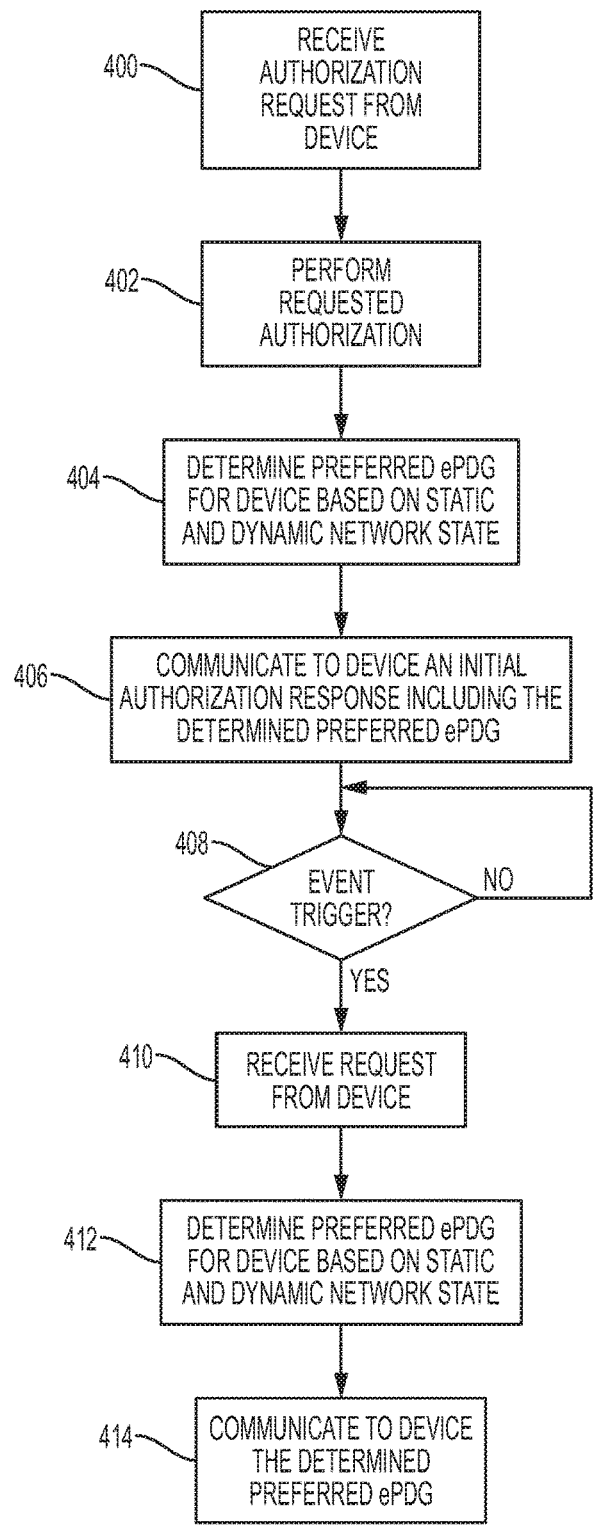
FIG. 4 is a flow chart illustrating steps that may be implemented by embodiments described herein for implementing an end-to-end VoWiFi solution in which an access node selection technique using a combination of subscription entitlement and nodal characteristics may be deployed.

FIG. 4 illustrates a flow chart of steps that may be implemented by embodiments described herein for implementing an end-to-end VoWiFi solution in which an access node selection technique using a combination of subscription entitlement and nodal characteristics may be deployed. Referring to FIG. 4, in step 400, an authorization request is received at the entitlement server from a network device. In accordance with features of embodiments described herein, the request is received via an untrusted (e.g., a WiFi) network. In step 402, the entitlement server authorizes the device. In step 404, the entitlement server determines a preferred ePDG for the device. In particular, the entitlement server accesses a network selection server, which contains static and dynamic information related to the various ePDGs of the network, including ePDG groupings. In one embodiment, the static and dynamic information includes at least one of resource usage, location, availability of mobility anchors, proximity of mobility anchors, handover opportunities, resiliency class, load balancing considerations, and time of day. In step 406, the entitlement server provides to the network device an initial authorization response comprising a response to the received authorization request, wherein the initial authorization response identifies the determined ePDG (e.g., by IP address or FQDN).

In step 408, a determination is made whether an event trigger has occurred, triggering a request from the device for updated ePDG information. If not, execution remains at step 408 until an event trigger occurs, at which point execution proceeds to step 410. In step 410, a request for updated ePDG information is received from the device. In step 412, the entitlement server determines a preferred ePDG for the device and in step 414, the entitlement server communicates the preferred ePDG information (including an IP address or FQDN) to the device.

Figure 5:
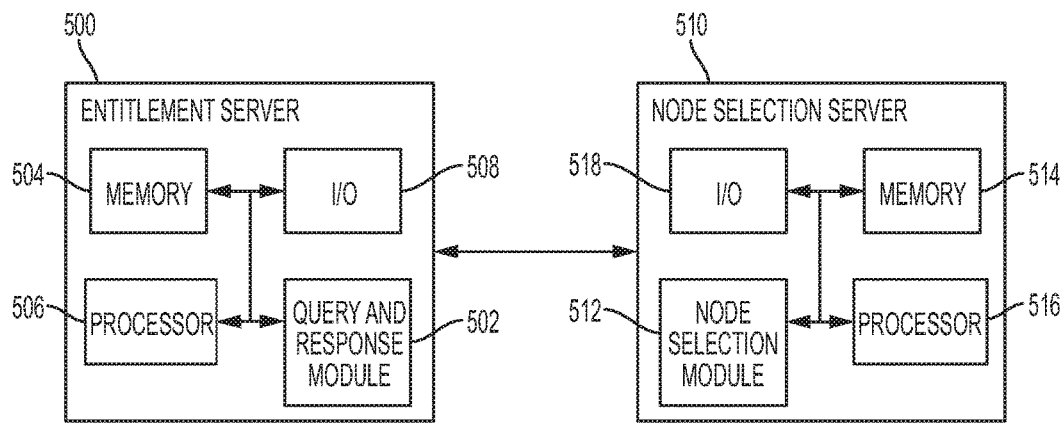
FIG. 5 is a simplified block diagram of a network element in which embodiments described herein for implementing an end-to-end VoWiFi solution in which an access node selection technique using a combination of subscription entitlement and nodal characteristics may be deployed.

FIG. 5 illustrates interaction between an entitlement server 500 and a node selection server 502 in accordance with features of embodiments described herein. Referring to FIG. 5, the entitlement server includes a query and response module 502, which may include software embodied in one or more tangible media for facilitating the activities described herein. In particular, the module 502 may include software for facilitating some of the processes illustrated in and described with reference to FIG. 4. The entitlement server 500 may also include a memory device 504 for storing information to be used in achieving the functions as outlined herein. Additionally, the entitlement server 500 may include a processor 506 that is capable of executing software or an algorithm (such as embodied in module 502) to perform the functions as discussed in this Specification. The entitlement server 500 may also include various I/O drivers and interfaces 508 necessary for performing functions described herein.

The node selection server 510 includes a node selection module 512, which may include software embodied in one or more tangible media for facilitating the activities described herein. In particular, the module 512 may include software for facilitating some of the processes illustrated in and described with reference to FIG. 4. The node selection server 510 may also include a memory device 514 for storing information to be used in achieving the functions as outlined herein. Additionally, the node selection server 510 may include a processor 516 that is capable of executing software or an algorithm (such as embodied in module 512) to perform the functions as discussed in this Specification. The node selection server 510 may also include various I/O drivers and interfaces 518 necessary for performing functions described herein.

It will be recognized that the servers 500, 510, shown in FIG. 5, as well as other network devices shown and described herein, may be implemented using one or more computer devices comprising software embodied in one or more tangible media for facilitating the activities described herein. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 3 and 4 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 3 and 4. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 6:
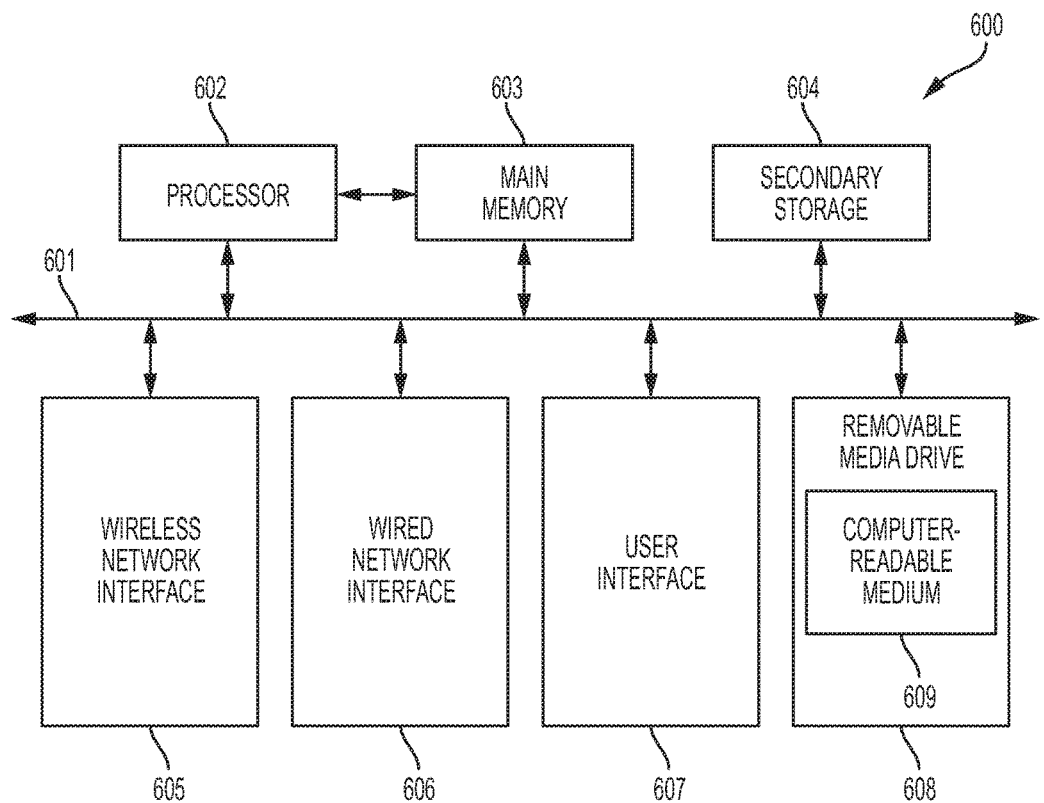
FIG. 6 illustrates a machine comprising an element of the various networks described herein in which embodiments described herein for implementing an end-to-end VoWiFi solution in which an access node selection technique using a combination of subscription entitlement and nodal characteristics may be deployed.

Turning to FIG. 6, illustrated therein is a simplified block diagram of an example machine (or apparatus) 600 that may be implemented as an element of a system for use in implementing a technique for enabling dynamic update of network device data models in accordance with embodiments described herein. The example machine 600 corresponds to network elements and computing devices that may be deployed in any one of the networks illustrated and described herein. In particular, FIG. 6 illustrates a block diagram representation of an example form of a machine within which software and hardware cause machine 600 to perform any one or more of the activities or operations discussed herein. As shown in FIG. 6, machine 600 may include a processor 602, a main memory 603, secondary storage 604, a wireless network interface 605, a wired network interface 606, a user interface 607, and a removable media drive 608 including a computer-readable medium 609. A bus 601, such as a system bus and a memory bus, may provide electronic communication between processor 602 and the memory, drives, interfaces, and other components of machine 600.

Processor 602, which may also be referred to as a central processing unit ("CPU"), can include any general or special-purpose processor capable of executing machine readable instructions and performing operations on data as instructed by the machine readable instructions. Main memory 603 may be directly accessible to processor 602 for accessing machine instructions and may be in the form of random access memory ("RAM") or any type of dynamic storage (e.g., dynamic random access memory ("DRAM")). Secondary storage 604 can be any non-volatile memory such as a hard disk, which is capable of storing electronic data including executable software files. Externally stored electronic data may be provided to computer 600 through one or more removable media drives 608, which may be configured to receive any type of external media such as compact discs ("CDs"), digital video discs ("DVDs"), flash drives, external hard drives, etc.

Wireless and wired network interfaces 605 and 606 can be provided to enable electronic communication between machine 600 and other machines via networks. In one example, wireless network interface 605 could include a wireless network controller ("WNIC") with suitable transmitting and receiving components, such as transceivers, for wirelessly communicating within a network. Wired network interface 606 can enable machine 600 to physically connect to a network by a wire line such as an Ethernet cable. Both wireless and wired network interfaces 605 and 606 may be configured to facilitate communications using suitable communication protocols such as, for example, Internet Protocol Suite ("TCP/IP"). Machine 600 is shown with both wireless and wired network interfaces 605 and 606 for illustrative purposes only. While one or more wireless and hardwire interfaces may be provided in machine 600, or externally connected to machine 600, only one connection option is needed to enable connection of machine 600 to a network.

A user interface 607 may be provided in some machines to allow a user to interact with the machine 600. User interface 607 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 608 represents a drive configured to receive any type of external computer-readable media (e.g., computer-readable medium 609). Instructions embodying the activities or functions described herein may be stored on one or more external computer-readable media. Additionally, such instructions may also, or alternatively, reside at least partially within a memory element (e.g., in main memory 603 or cache memory of processor 602) of machine 600 during execution, or within a non-volatile memory element (e.g., secondary storage 604) of machine 600. Accordingly, other memory elements of machine 600 also constitute computer-readable media. Thus, "computer-readable medium" is meant to include any medium that is capable of storing instructions for execution by machine 600 that cause the machine to perform any one or more of the activities disclosed herein.

Not shown in FIG. 6 is additional hardware that may be suitably coupled to processor 602 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 600 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 600 to appropriately manage the operation of the hardware components therein.

The elements, shown and/or described with reference to machine 600, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein (e.g., the steps shown in FIGS. 3 and 4) may be implemented in software in, for example, leaf nodes. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, leaf and spine nodes are network devices or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 603, secondary storage 604, computer-readable medium 609) can store data used for the operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 602) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of networks illustrated herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving at a network node associated with a mobile core network an authorization request from a network device, wherein the authorization request is received via an untrusted network;
   performing authorization of the network device at the network node and subsequent to the receiving;
   determining a preferred network access node for the network device subsequent to the receiving, wherein the determining comprises accessing a node selection information repository containing static and dynamic information related to network access nodes and network access node groupings, and wherein the static and dynamic information comprises at least one of: resource usage, location, availability of mobility anchors, proximity of mobility anchors, handover opportunities, resiliency class, load balancing considerations, and availability based on time of day;
   providing to the network device an initial authorization response comprising a response to the received authorization request, wherein the initial authorization response identifies the determined preferred network access node;
   receiving a request at the network node for an updated network access node IP address;
   determining a new preferred network access node for the network device; and
   providing to the network device an IP address for the determined new preferred network access node.

2. The method of claim 1, wherein the determining comprises optimizing network access node selection for a given service using a combination of entitlement characteristics together with node selection information.

3. The method of claim 1, wherein the network node comprises an entitlement server.

4. The method of claim 1, wherein the network access node comprises an evolved Packet Data Gateway ("ePDG").

5. The method of claim 1, wherein the determined network access node is identified by at least one of an IP address and a Fully Qualified Domain Name ("FQDN").

6. The method of claim 1, wherein the untrusted network comprises a WiFi network.

7. A non-transitory tangible media that includes code for execution and is operable to perform operations when executed by a processor, comprising:
   receiving at a network node associated with a mobile core network an authorization request from a network device, wherein the authorization request is received via an untrusted network;
   performing node authorization of the network device at the network node subsequent to the receiving;
   determining a preferred network access node for the network device subsequent to the receiving, wherein the determining comprises accessing a node selection information repository containing static and dynamic information related to network access nodes and network access node groupings, and wherein the static and dynamic information comprises at least one of: resource usage, location, availability of mobility anchors, proximity of mobility anchors, handover opportunities, resiliency class, load balancing considerations, and availability based on time of day;
   providing to the network device an initial authorization response comprising a response to the received authorization request, wherein the initial authorization response identifies the determined preferred network access node;
   receiving a request at the network node for an updated network access node IP address;
   determining a new preferred network access node for the network device; and
   providing to the network device an IP address for the determined new preferred network access node.

8. The media of claim 7, wherein the determining comprises optimizing network access node selection for a given service using a combination of entitlement characteristics together with node selection information.

9. The media of claim 7, wherein the network node comprises an entitlement server.

10. The media of claim 7, wherein the network access node comprises an evolved Packet Data Gateway ("ePDG").

11. The media of claim 7, wherein the determined network access node is identified by at least one of an IP address and a Fully Qualified Domain Name ("FQDN").

12. The media of claim 7, wherein the untrusted network comprises a WiFi network.

13. An apparatus comprising:
   a memory element configured to store data; and
   a processor operable to execute instructions associated with the data;
   the apparatus configured for:
      receiving an authorization request from a network device, wherein the authorization request is received via an untrusted network;

performing authorization of the network device subsequent to the receiving;

determining a preferred network access node for the network device subsequent to the receiving, wherein the determining comprises accessing a node selection information repository containing static and dynamic information related to network access nodes and network access node groupings and wherein the static and dynamic information comprises at least one of: resource usage, location, availability of mobility anchors, proximity of mobility anchors, handover opportunities, resiliency class, load balancing considerations, and availability based on time of day;

providing to the network device an initial authorization response comprising a response to the received authorization request, wherein the initial authorization response identifies the determined preferred network access node;

receiving a request for an updated network access node IP address;

determining a new preferred network access node for the network device; and providing to the network device an IP address for the determined new preferred network access node.

14. The apparatus of claim 13, wherein the determining comprises optimizing network access node selection for a given service using a combination of entitlement characteristics together with node selection information.

15. The apparatus of claim 13, wherein the network access node comprises an evolved Packet Data Gateway ("ePDG").

16. The apparatus of claim 13, wherein the determined network access node is identified by at least one of an IP address and a Fully Qualified Domain Name ("FQDN").

17. The apparatus of claim 13, wherein the untrusted network comprises a WiFi network.

* * * * *